(12) United States Patent
Yamashita

(10) Patent No.: US 7,667,808 B2
(45) Date of Patent: Feb. 23, 2010

(54) LIQUID CRYSTAL DISPLAY DEVICE AND METHOD OF DRIVING THE SAME

(75) Inventor: Hidefumi Yamashita, Yokohama (JP)

(73) Assignee: LG Display Co., Ltd., Seoul (KR)

( * ) Notice: Subject to any disclaimer, the term of this patent is extended or adjusted under 35 U.S.C. 154(b) by 250 days.

(21) Appl. No.: 11/642,954

(22) Filed: Dec. 21, 2006

(65) Prior Publication Data

US 2007/0146606 A1 Jun. 28, 2007

(30) Foreign Application Priority Data

Dec. 28, 2005 (JP) .......................... P2005-379810
Dec. 28, 2005 (JP) .......................... P2005-379830

(51) Int. Cl.
*G02F 1/1343* (2006.01)

(52) U.S. Cl. ...................... 349/141; 349/139

(58) Field of Classification Search .......... 349/139–148
See application file for complete search history.

(56) References Cited

U.S. PATENT DOCUMENTS

| | | | |
|---|---|---|---|
| 5,162,933 A | 11/1992 | Kaduda et al. | |
| 5,317,433 A | 5/1994 | Miyawaki et al. | |
| 5,339,181 A | 8/1994 | Kim et al. | |
| 5,462,887 A | 10/1995 | Glück | |
| 5,668,379 A | 9/1997 | Ono et al. | |
| 5,731,856 A | 3/1998 | Kim et al. | |
| 5,771,083 A | 6/1998 | Fujihara et al. | |
| 5,793,460 A | 8/1998 | Yang | |
| 5,847,781 A | 12/1998 | Ono et al. | |
| 2005/0024548 A1* | 2/2005 | Choi et al. ................... 349/43 |

FOREIGN PATENT DOCUMENTS

| | | |
|---|---|---|
| CN | 1688920 A | 10/2005 |
| JP | 5-108023 | 4/1993 |
| JP | 11-30783 A | 2/1999 |

* cited by examiner

*Primary Examiner*—Kevin S Wood
(74) *Attorney, Agent, or Firm*—McKenna Long & Aldridge LLP

(57) ABSTRACT

A liquid crystal display device includes a first electrode and a second electrode on a first substrate, wherein a horizontal electric field is generated between the first and second electrodes, and a third electrode on a second substrate, wherein a longitudinal electric field is generated between the third electrode and the first and second electrodes. In the liquid crystal display device, control of a wide viewing angle and a narrow viewing angle is enabled.

3 Claims, 10 Drawing Sheets

LIQUID CRYSTAL DISPLAY DEVICE AND METHOD OF DRIVING THE SAME This application claims the benefit of Japanese Patent Application No. JP 2005-379810 and JP2005-379830, filed on, Dec. 28, 2005, which are hereby incorporated by reference as if fully set forth herein.

BACKGROUND OF THE INVENTION

1. Field of the Invention

The present invention relates to a liquid crystal display device in which a wide viewing angle is controlled by controlling a longitudinal electric field, and a method of driving the same.

2. Discussion of the Related Art

A liquid crystal display device, particularly, a liquid crystal display device using a thin film transistor (TFT) is widely used, for example, in a mobile communication telephone and a TV.

Among the above-mentioned displays, there is required a personal display in which displayed content can be seen by a user of the personal display, but is not seen to another person who views the personal display in the horizontal direction.

Particularly, the displayed content may be shared with several people sometimes, but preferably, may be used personally.

In the past, in order to improve the viewing angle characteristic, in-plane switching (IPS) technology and fringe field switching (FFS) technology have been proposed. The IPS and FFS technologies, are manufactured in commercial scale (for example, See Japanese Unexamined Patent Application Publication Nos. 2003-75819 and Hei 5-108023).

According to the IPS technology, electrodes are formed on a same substrate and an electric field is applied between the electrodes to activate a liquid crystal response to display gray scale. Because the electrodes are formed on the same substrate, a parallel component of the electric field is strong, and consequently, characteristics of a wide viewing angle can be obtained.

According to the FFS technology, an insulator film is put on a same substrate to form a first electrode and a second electrode and an electric field is applied between the electrodes such that the liquid crystals respond to display gray scale. Because the electrodes are formed on the same substrate, the parallel component of the electric field is strong and consequently, a wide viewing angle can be obtained.

However, according to the related art, even though the characteristics related to the viewing angle are improved, there is a limit that the viewing angle cannot be adjusted to be narrow or wide in order to maintain the security of displayed information.

SUMMARY OF THE INVENTION

Accordingly, the present invention is directed to a liquid crystal display device and a driving method thereof that substantially obviate one or more problems due to limitations and disadvantages of the related art.

An advantage of the present invention is to provide a liquid crystal display device having a viewing angle controlling function of changing a viewing angle to be wide when information is displayed on a display and to be narrow when the information is of a personal nature or security in a liquid crystal display device with a wide viewing angle, and a method of driving the same.

To achieve this and other advantages and in accordance with the purpose of the invention, as embodied and broadly described herein, a liquid crystal display device includes a first electrode and a second electrode on a first substrate, wherein a horizontal electric field is generated between the first and second electrodes, and a third electrode on a second substrate facing the first substrate, wherein a longitudinal electric field is generated between the third electrode and the first and second electrodes.

In another aspect of the present invention, a method of driving a liquid crystal display device includes forming a first electrode and a second electrode on a first substrate to generate a first electric field; forming a third electrode on a second substrate to generate a second electric field; and adjusting a voltage applied to the third electrode to control a viewing angle.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principles of the invention. In the drawings.

DETAILED DESCRIPTION OF THE ILLUSTRATED EMBODIMENTS

Reference will now be made in detail to the embodiments of the present invention, examples of which are illustrated in the accompanying drawings.

Figure 1:
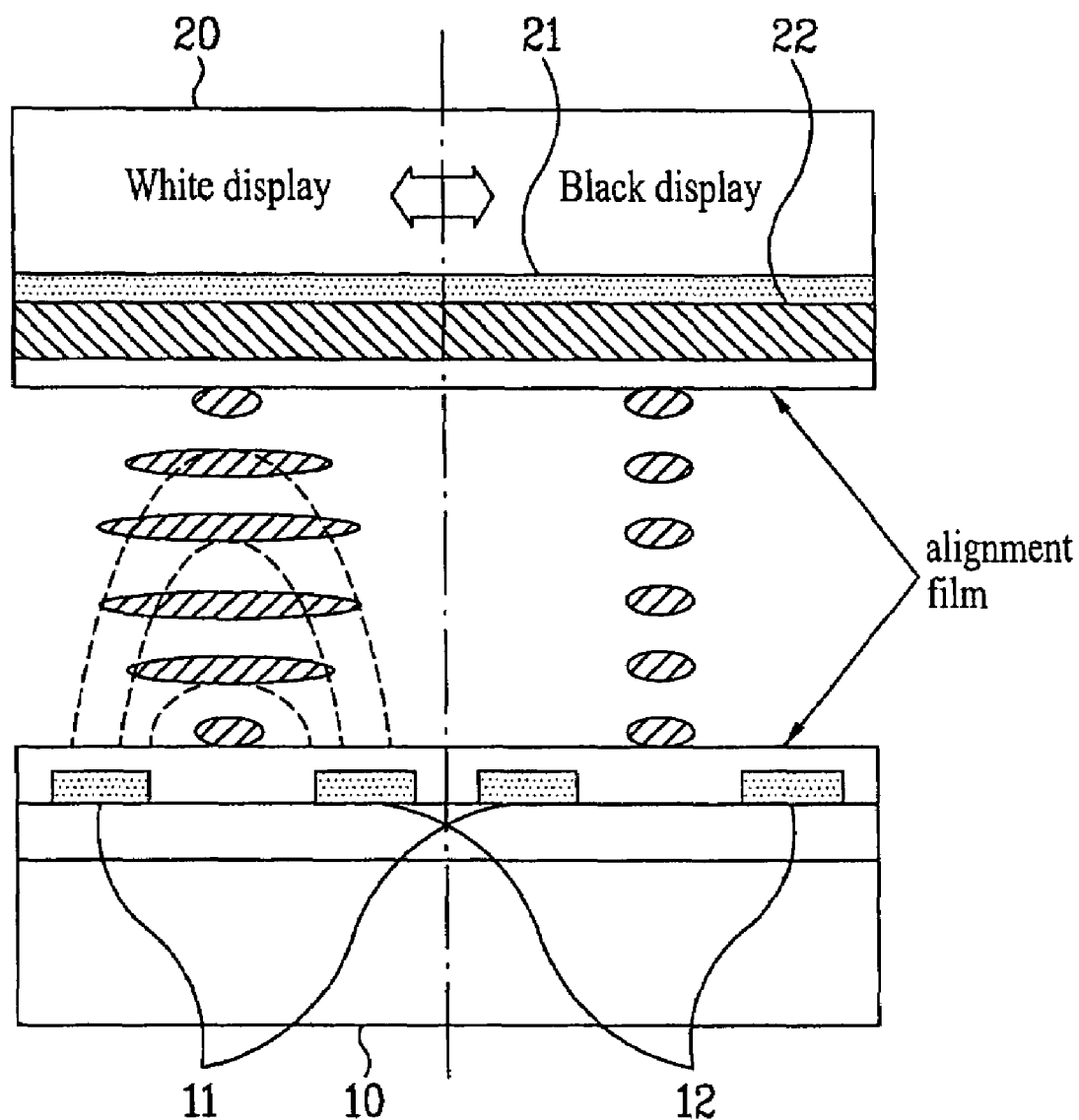
FIG. 1 is a schematic view illustrating a wide viewing angle mode in a liquid crystal display device having an in-plane switching (IPS) structure according to an embodiment of the present invention.

FIG. 1 is a schematic view illustrating a wide viewing angle mode in a liquid crystal display device having an in-plane switching (IPS) structure according to an embodiment of the present invention.

As illustrated in FIG. 1, a first electrode 11 and a second electrode 12 are formed on a substrate 10. A substrate 20 facing the substrate 10 has a third electrode 21.

A voltage of the third electrode 21 may be adjusted to decrease a longitudinal electric field so that a wide viewing angle mode is set.

The adjustment of the voltage applied to the third electrode 21 enables the switching between the wide viewing angle mode and a narrow viewing angle mode.

Figure 2:
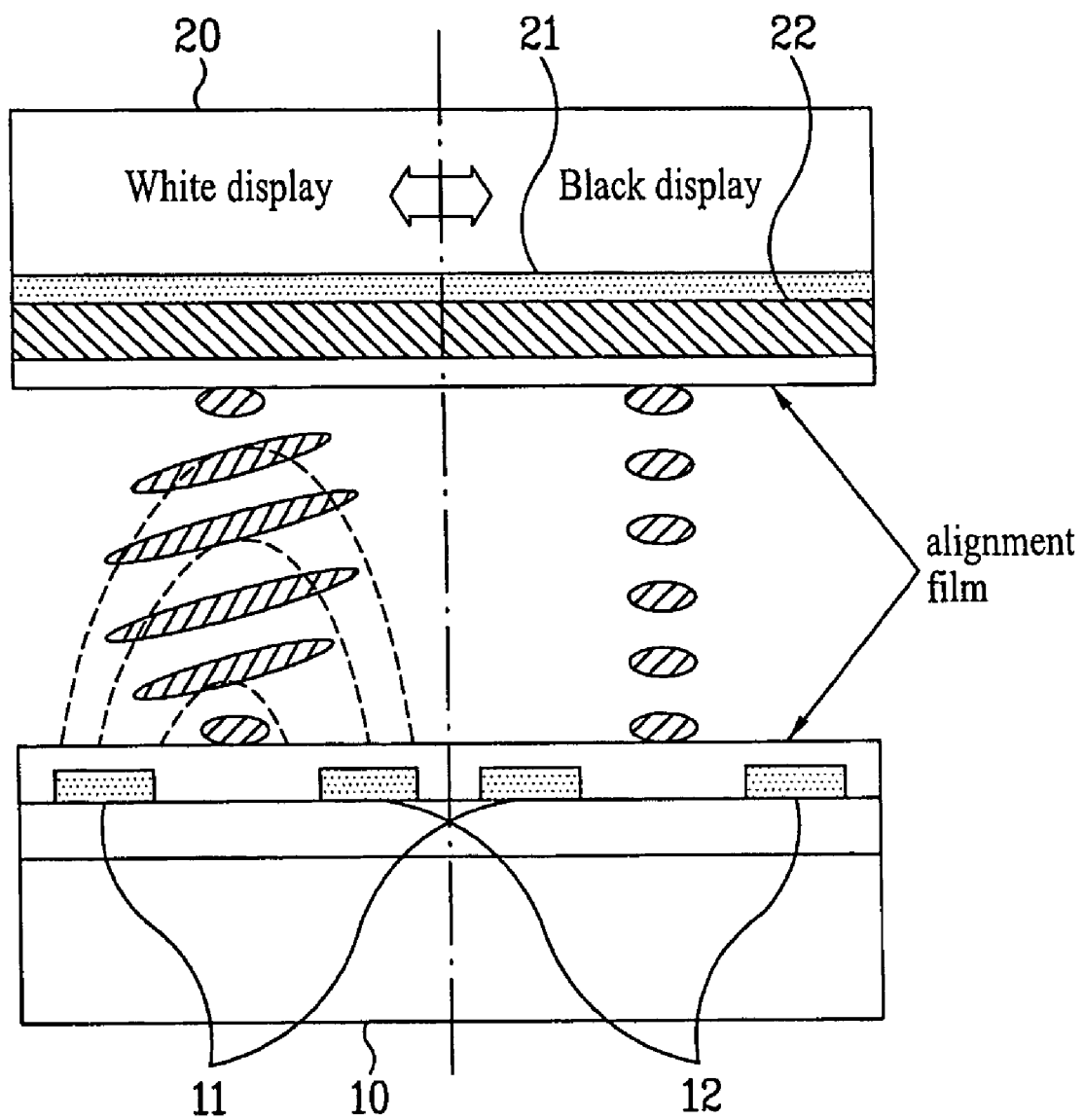
FIG. 2 is a schematic view illustrating a narrow viewing angle mode in a liquid crystal display device having an IPS structure according to an embodiment of the present invention.

FIG. 2 is a schematic view illustrating a narrow viewing angle mode in a liquid crystal display device having an IPS structure according to an embodiment of the present invention.

As illustrated in FIG. 2, since liquid crystals can be slant by which a voltage is applied to the third electrode 21 to generate the longitudinal electric field, the viewing angle is controlled. At this time the narrow viewing angle mode is set.

The substrate 20 has a dielectric film 22 on the third electrode 21 to reduce an influence of the longitudinal electric field.

Even when there is no dielectric film 22, the switching between the wide viewing angle mode and the narrow viewing angle mode is possible. However, in this case, contrast is deteriorated in the wide viewing angle mode. On the other hand, when the dielectric film 22 is additionally formed, the contrast is prevented from being deteriorated and the switching between the wide viewing angle mode and the narrow viewing angle mode is enabled.

Results of a simulation carried out for the viewing angle will be described with reference to FIGS. 3 to 7.

FIGS. 3 to 7 illustrate a distribution of contour lines of contrast at a viewing angle of 360 degrees.

In the simulation, several parameters are used such as a refractive index of the liquid crystals, no=1.473 and ne=1.550, a cell gap of about 4.5 micrometers, and a pretilt angle about 1 degree. Moreover, a rubbing angle (alignment direction of liquid crystals) is designed to be slant by about 15 degrees with respect to a slit of an electrode without using an optical compensation film.

Figure 3:
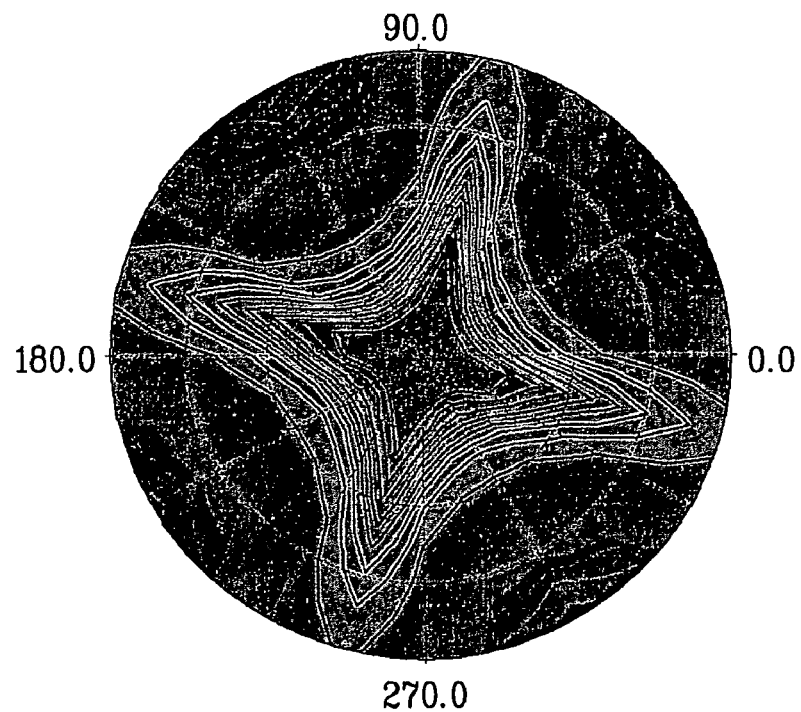
FIG. 3 is a view illustrating a simulation result of a liquid crystal display device having a related art IPS single domain structure according to an embodiment of the present invention.

FIG. 3 is a view illustrating a simulation result of a liquid crystal display device having an IPS single domain structure according to an embodiment of the present invention.

In this embodiment, a width of the first electrode 11 is about 5 micrometers, a gap between the first and second electrodes 11 and 12 is about 10 micrometers, and a potential difference between the first electrode 11 and the second electrode 12 is about 6.5 V.

As a result of the simulation, a front contrast ratio becomes 876 and the characteristic as illustrated in FIG. 3 is obtained.

Figure 4:
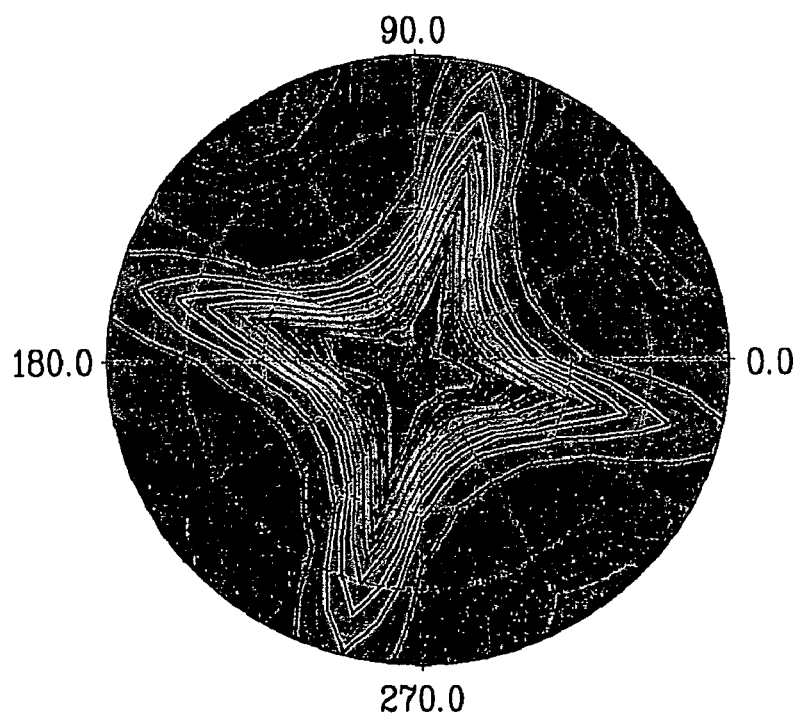
FIG. 4 is a view illustrating a first simulation result of a liquid crystal display device using a third electrode according to an embodiment of the present invention.

On the other hand, FIG. 4 is a view illustrating a first simulation result of a liquid crystal display device using the third electrode 21 according to the embodiment of the present invention.

In more detail, FIG. 4 illustrates a result of the simulation when the third electrode 21 is formed on the substrate 20 facing the substrate 10 on which the first electrode 11 and the second electrode 12 are formed and a voltage applied to the third electrode 21 is identical to the voltage applied to the first electrode 11. Other conditions are identical to those of the case illustrated in FIG. 3.

As illustrated in FIG. 4, although a tendency of the contrast is identical to that of the case illustrated in FIG. 3, the front contrast ratio is small due to the influence of the third electrode 21 (for example, the front contrast is ratio: 234).

Figure 5:
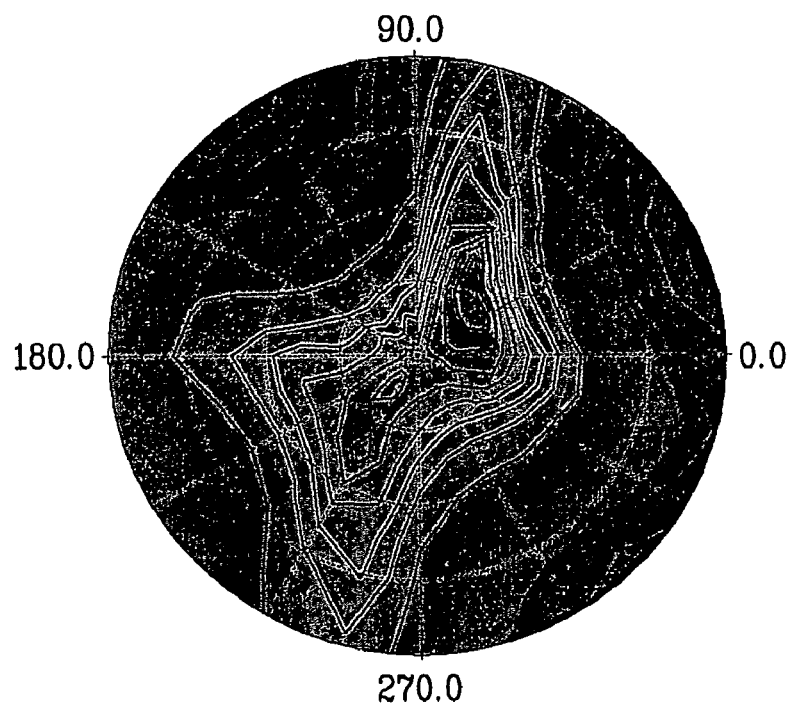
FIG. 5 is a view illustrating a second simulation result of a liquid crystal display device using a third electrode according to an embodiment of the present invention.

FIG. 5 is a view illustrating a second simulation result of a liquid crystal display device using the third electrode 21 according to an embodiment of the present invention.

In more detail, FIG. 5 illustrates a result of a simulation in which the same cell as that in FIG. 4 is used and the voltage applied to the third electrode 21 is higher than the voltage of the first electrode 11 by about 1.2 V.

As illustrated in FIG. 5, although the front contrast ratio is smaller, namely, about 120, left and right viewing angle characteristics may be deteriorated without changing upper and lower viewing angle characteristics by such degrees.

Figure 6:
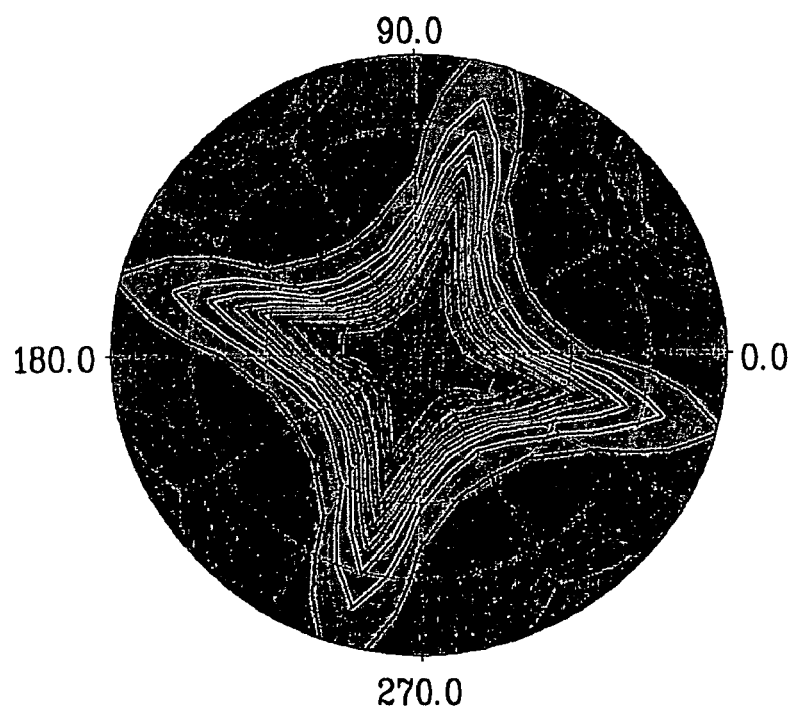
FIG. 6 is a view illustrating a third simulation result of a liquid crystal display device using a third electrode according to an embodiment of the present invention.

FIG. 6 is a view illustrating a third simulation result of a liquid crystal display device using the third electrode 21 according to an embodiment of the present invention.

In more detail, FIG. 6 illustrates a result of a simulation that a dielectric film 22 with a relative dielectric constant of about 3 is formed to be about 3.5 micrometers on the substrate 20 facing the substrate 10 in which the first electrode 11 and the second electrode 12 are formed, and the same voltage as that of the first electrode 11 is applied to the third electrode 21.

As illustrated in FIG. 6, the viewing angle characteristic is identical to that in the IPS mode of the related art (See FIG. 3), and the front contrast ratio is higher than that of the case without the dielectric film 22 but similar as that of the related art IPS mode (the front contrast ratio: 688).

Figure 7:
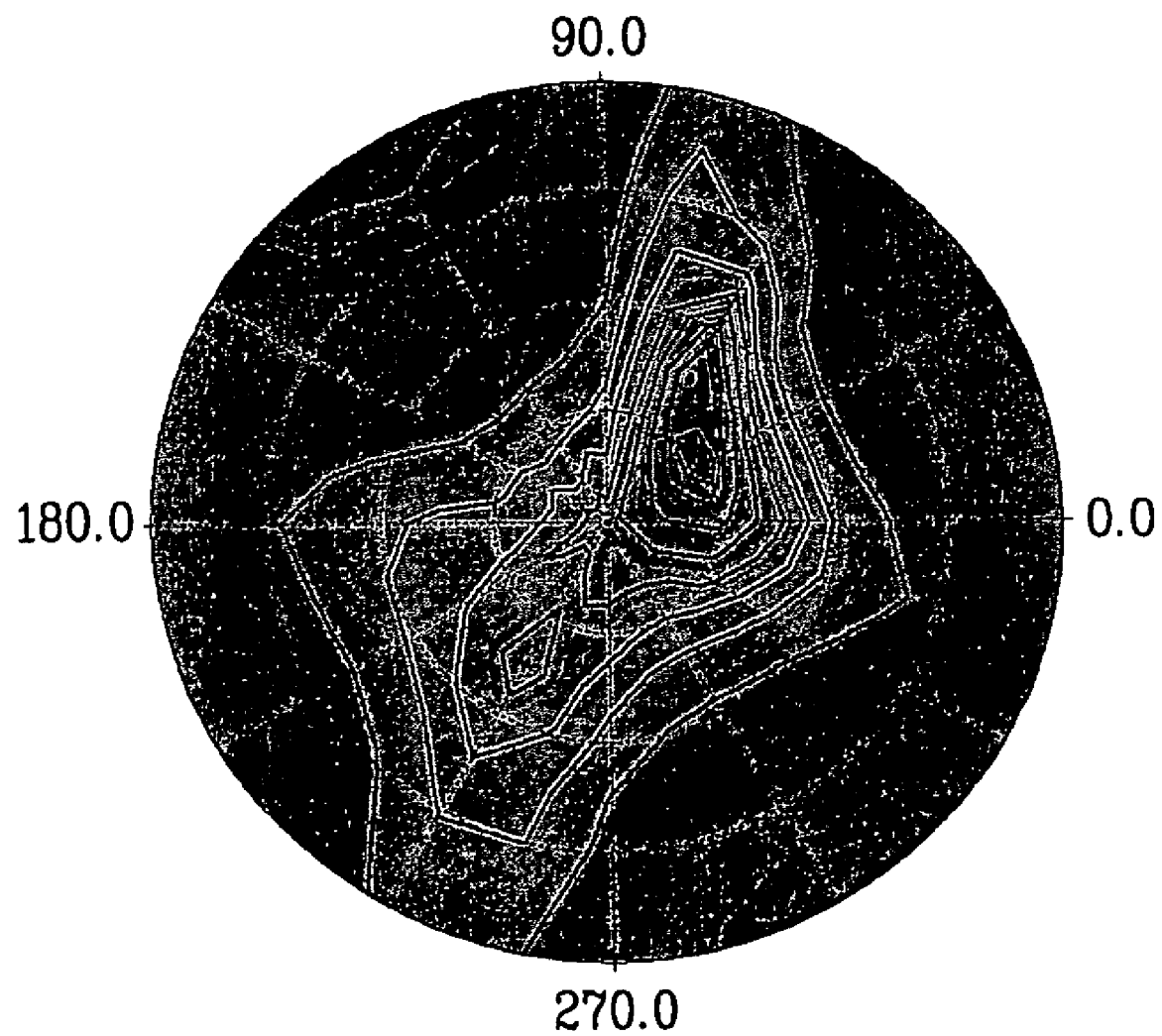
FIG. 7 is a view illustrating a fourth simulation result of a liquid crystal display device using a third electrode according to an embodiment of the present invention.

FIG. 7 is a view illustrating a fourth simulation result of a liquid crystal display device using the third electrode 21 according to an embodiment of the present invention.

FIG. 7 illustrates a result of a simulation in which the same cell as that in FIG. 6 is used and the voltage applied to the third electrode 21 is higher than the voltage of the first electrode 11 by about 1.2 V.

As illustrated in FIG. 7, the left and right viewing angle characteristics may be deteriorated without changing the upper and lower viewing angle characteristics, identical to the case illustrated in FIG. 5.

Moreover, the front contrast ratio is set to a high value (front contrast ratio: 184) in comparison to the case without the dielectric film 22.

As described above, according to the embodiment of the present invention, the third electrode is formed in the substrate facing the substrate in which the first electrode and the second electrode are formed and the voltage applied to the third electrode is controlled so that a liquid crystal display device having a desired viewing angle characteristic can be implemented.

Moreover, the dielectric film is formed on the third electrode so that the front contrast ratio of the same level as that of the related art IPS structure and the viewing angle can be controlled.

Figure 8:
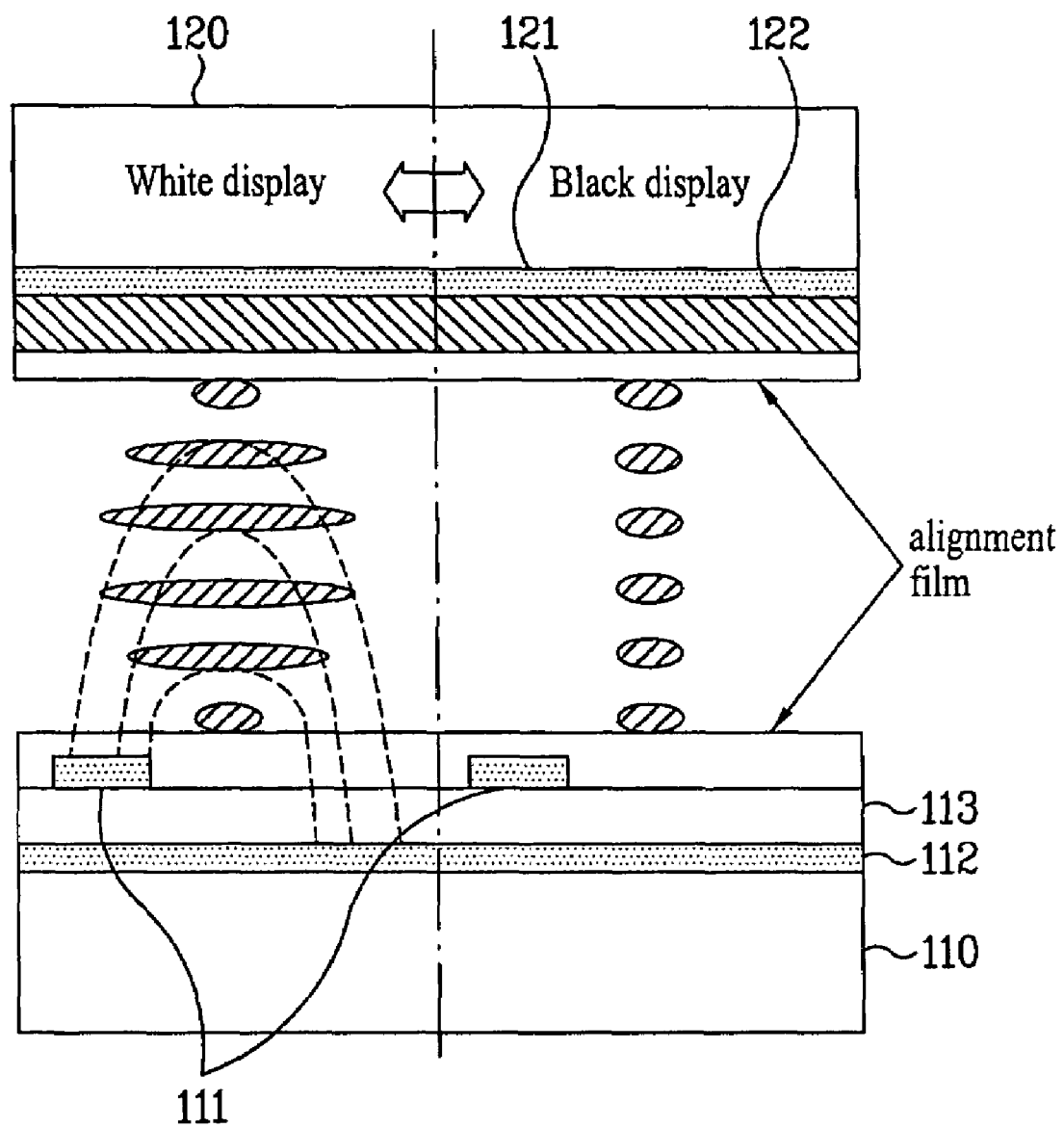
FIG. 8 is a schematic view illustrating a wide viewing angle mode in a liquid crystal display device having a fringe field switching (FFS) structure according to another embodiment of the present invention.

FIG. 8 is a schematic view illustrating a wide viewing angle mode in a liquid crystal display device having a fringe field switching (FFS) structure according to another embodiment of the present invention.

As illustrated in FIG. 8, on a substrate 110, identical to a related art FFS structure, a first electrode 111 and a second electrode 112 are formed by interposing an insulator film 113.

In the present invention, a substrate 120 facing the substrate 110 has a third electrode 121.

Here, a voltage of the third electrode 121 is adjusted to decrease a longitudinal electric field so that a wide viewing angle mode is set.

The adjustment of the voltage applied to the third electrode 121 enables the switching between the wide viewing angle mode and a narrow viewing angle mode.

Figure 9:
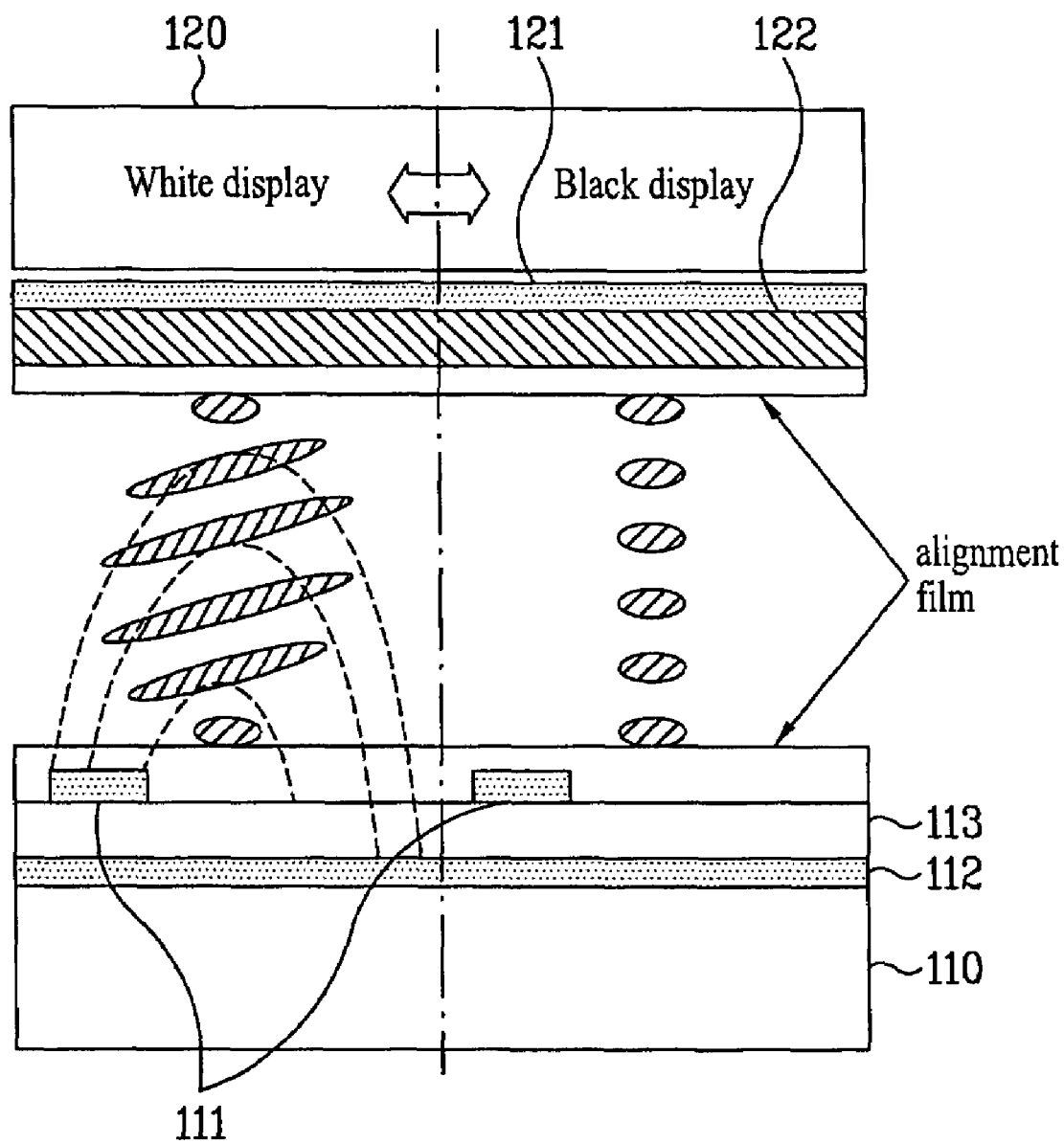
FIG. 9 is a schematic view illustrating a narrow viewing angle mode in a liquid crystal display device having a fringe field switching (FFS) structure according to another embodiment of the present invention.

FIG. 9 is a schematic view illustrating a narrow viewing angle mode in a liquid crystal display device having an FFS structure according to another embodiment of the present invention.

As illustrated in FIG. 9, since liquid crystals can be slant by which a voltage is applied to the third electrode 121 to generate the longitudinal electric field, the viewing angle is controlled. At this time the narrow viewing angle mode is set.

The substrate 120 has a dielectric film 122 on the third electrode 121 to reduce an influence of the longitudinal electric field.

Even when there is no dielectric film 122, the switching between the wide viewing angle mode and the narrow viewing angle mode is possible. However, in this case, contrast is deteriorated in the wide viewing angle mode. In this case, when the dielectric film 122 is additionally formed, the contrast is prevented from being deteriorated and the switching between the wide viewing angle mode and the narrow viewing angle mode is enabled.

Next, results of a simulation carried out for the viewing angle will be described with reference to FIGS. 10 to 14.

FIGS. 10 to 14 illustrate a distribution of contour lines of contrast at a viewing angle of 360 degrees.

In the simulation, several parameters are used such as a refractive index of the liquid crystals, no=1.473 and ne=1.550, a cell gap of about 4.5 micrometers, and a pretilt angle of about 1 degree. Moreover, a rubbing angle (alignment direction of liquid crystals) is designed to be slant of about 15 degrees with respect to a slit of an electrode without using an optical compensation film.

Figure 10:
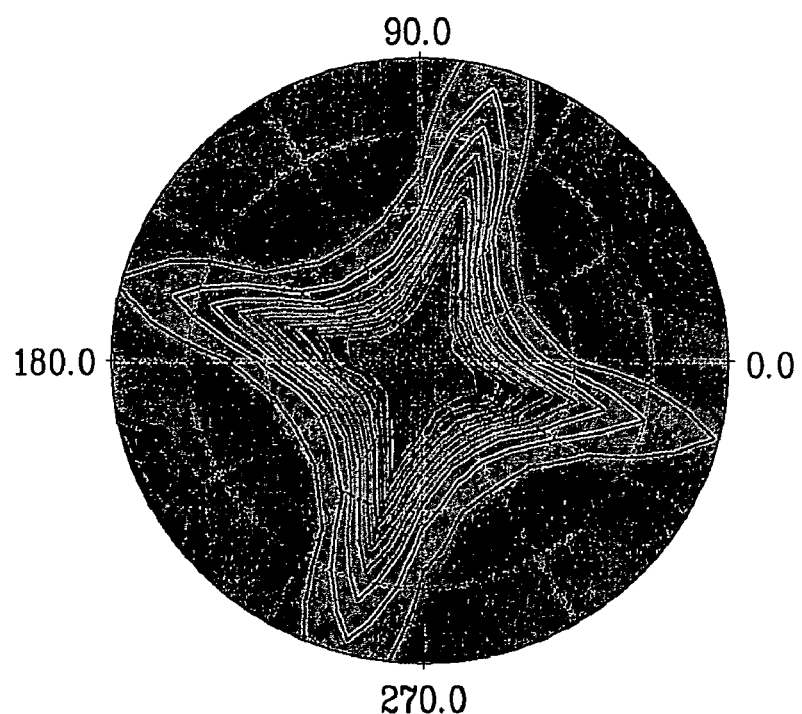
FIG. 10 is a view illustrating a simulation result of a liquid crystal display device having a related art FFS single domain structure according to another embodiment of the present invention.

FIG. 10 is a view illustrating a simulation result of a liquid crystal display device having FFS single domain structure of the related art according to another embodiment of the present invention.

A majority of related art FFS have a horizontal slit structure. Here, like the single domain IPS structure, a pattern, in which a slit for the first electrode is formed vertically, is used.

Moreover, a width of the first electrode 111 is about 3 micrometers, a gap between the first electrodes 111 is about 10 micrometers, and a potential difference between the first electrode 111 and the second electrode 112 is about 7.5 V.

As a result of the simulation, a front contrast ratio is about 606 and the characteristic as illustrated in FIG. 10 is obtained.

Figure 11:
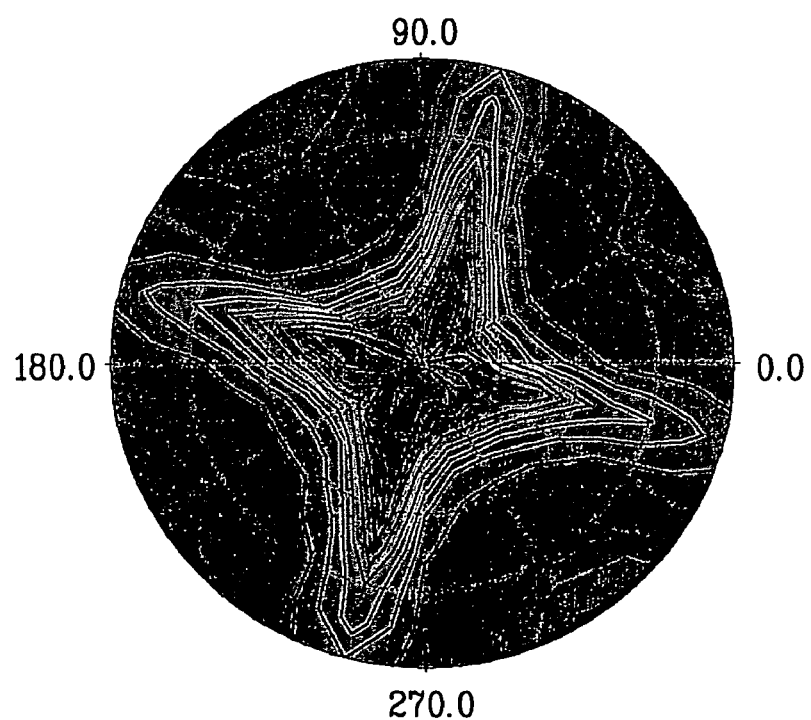
FIG. 11 is a view illustrating a first simulation result of a liquid crystal display device using a third electrode according to another embodiment of the present invention.

On the other hand, FIG. 11 is a view illustrating a first simulation result of a liquid crystal display device using the third electrode 121 according to an embodiment of the present invention.

In more detail, FIG. 11 illustrates a result of the simulation when the third electrode 121 is formed on the substrate 120 facing the substrate 110 in which the first electrode 111 and the second electrode 112 are formed and a voltage applied to the third electrode 121 is identical to the voltage applied to the first electrode 111. Other conditions are identical to those of the case illustrated in FIG. 10.

As illustrated in FIG. 11, although a tendency of the contrast is identical to that of the case illustrated in FIG. 10, the front contrast ratio is small due to the influence of the third electrode 121 (the front contrast ratio: 270).

Figure 12:
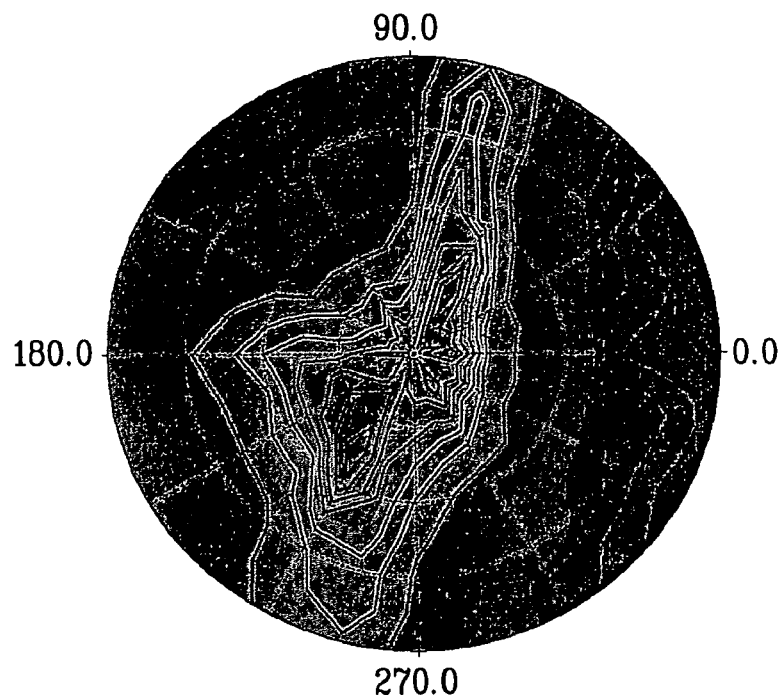
FIG. 12 is a view illustrating a second simulation result of a liquid crystal display device using a third electrode according to another embodiment of the present invention.

FIG. 12 is a view illustrating a second simulation result of a liquid crystal display device using the third electrode 121 according to the above embodiment of the present invention.

In more detail, FIG. 12 illustrates a result of a simulation in which the same cell as that in FIG. 11 is used and the voltage applied to the third electrode 121 is higher than the voltage of the first electrode 111 by about 1.5 V.

As illustrated in FIG. 12, although the front contrast ratio becomes smaller, namely, 172, left and right viewing angle characteristics may be deteriorated without changing upper and lower viewing angle characteristics by such degrees.

Figure 13:
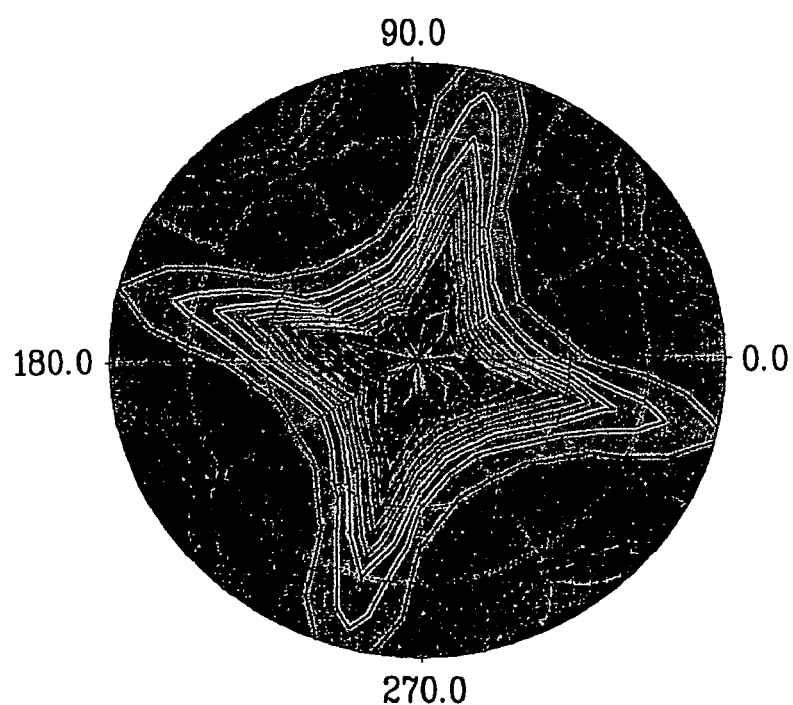
FIG. 13 is a view illustrating a third simulation result of a liquid crystal display device using a third electrode according to another embodiment of the present invention.

FIG. 13 is a view illustrating a third simulation result of a liquid crystal display device using the third electrode 121 according to the above embodiment of the present invention.

In more detail, FIG. 13 illustrates a result of a simulation that a dielectric film 122 with a relative dielectric constant of about 3 is formed to be approximately 3.5 micrometers on the substrate 20 facing the substrate 110 in which the first electrode 111 and the second electrode 112 are formed, and the same voltage as that of the first electrode 111 is applied to the third electrode 121.

As illustrated in FIG. 13, the viewing angle characteristic is identical to that in the related art FFS mode (See FIG. 10), and the front contrast ratio is higher than that of the case without the dielectric film 122, but similar as that of the related art FFS mode (the front contrast ratio: 592).

Figure 14:
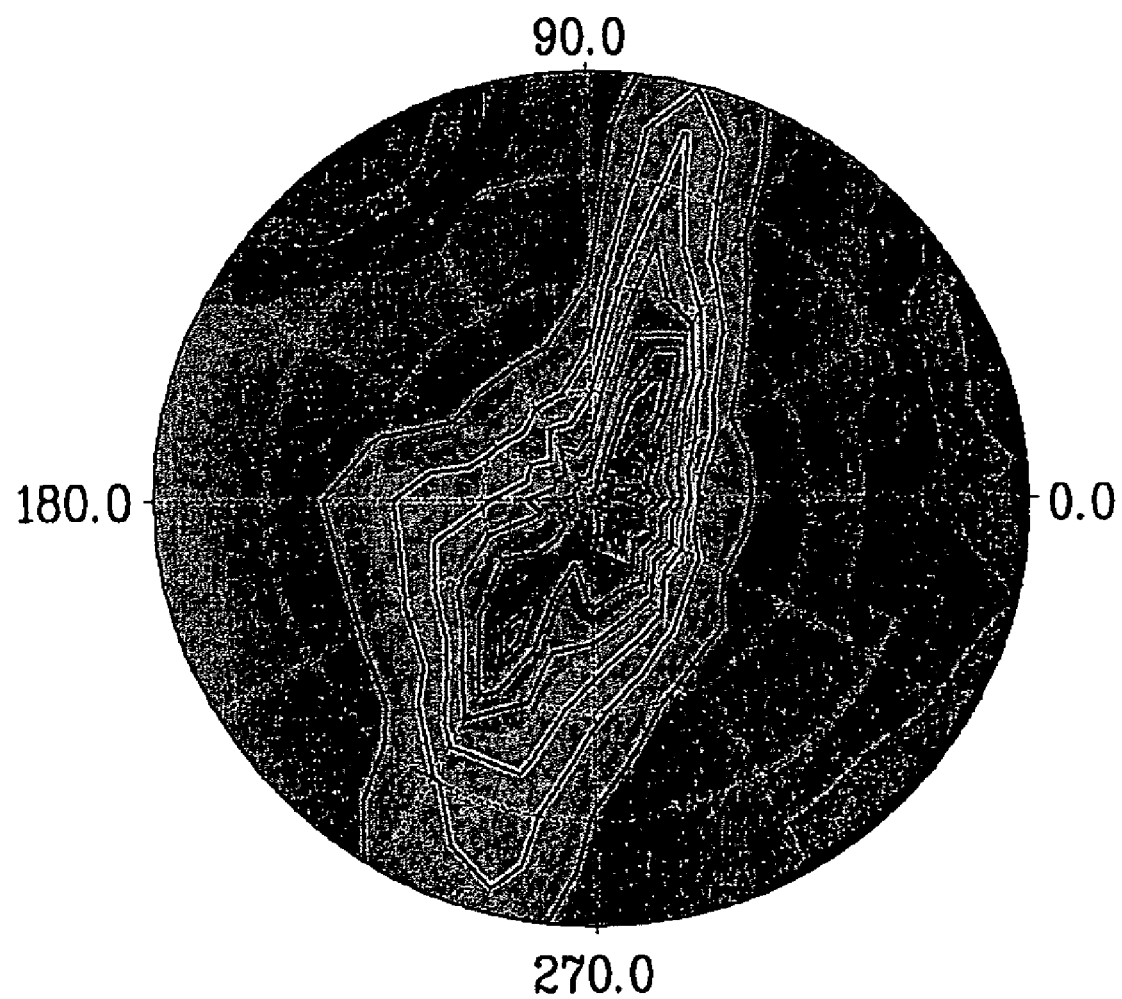
FIG. 14 is a view illustrating a fourth simulation result of a liquid crystal display device using a third electrode according to another embodiment of the present invention.

FIG. 14 is a view illustrating a fourth simulation result of a liquid crystal display device using the third electrode 121 according to the above embodiment of the present invention.

In more detail, FIG. 14 illustrates a result of a simulation in which the same cell as that in FIG. 13 is used and the voltage applied to the third electrode 121 is higher than the voltage of the first electrode 111 by about 3.3 V.

As illustrated in FIG. 14, the left and right viewing angle characteristics may be deteriorated without changing the upper and lower viewing angle characteristics, identical to the case illustrated in FIG. 12.

Moreover, the front contrast ratio is set to a high value (front contrast ratio: 228) in comparison to the case without the dielectric film 122.

As described above, according to another embodiment of the present invention, the third electrode is formed in the substrate facing the substrate in which the first electrode and the second electrode are formed and the voltage applied to the third electrode is controlled so that a liquid crystal display device having a desired viewing angle characteristic can be implemented.

Moreover, the dielectric film is formed on the third electrode so that the front contrast ratio of the same level as those of the related art IPS/FFS structures and the viewing angle can be controlled.

According to the present invention, it is possible to implement a liquid crystal display device having a viewing angle controlling function of changing a viewing angle to be wide when information is displayed on a display and to be narrow when the information is of a personal nature or needs to be secured in a liquid crystal display device with a wide viewing angle.

It will be apparent to those skilled in the art that various modifications and variations can be made in the present invention without departing from the spirit or scope of the inventions. Thus, it is intended that the present invention cover the modifications and variations of this invention provided they come within the scope of the appended claims and their equivalents.

What is claimed is:

1. A method of driving a liquid crystal display (LCD) device, comprising:

wherein the LCD device is one of an in plane switching mode and a fringe field switching mode, the LCD device having liquid crystal between upper and lower substrates includes first and second electrodes on the lower substrate to apply a first electric field to the liquid crystal, a third electrode on the upper substrate to apply a second field to the liquid crystal along with the first and second electrodes, providing a wide viewing angle mode, when the voltage of the third electrode on the upper substrate is the same as the voltage of the first electrode on the lower substrate, wherein upper, lower, left and right viewing angle characteristics provide the wide viewing angle mode;

providing a narrow viewing angle mode, when the voltage of the third electrode on the upper substrate is higher than the voltage of the first electrode on the lower substrate, wherein the left and right viewing angle characteristics is deteriorated without changing upper and lower viewing angle characteristics at the narrow viewing angle mode; and switching the wide viewing angle mode and the narrow viewing angle mode by adjusting a voltage applied to the third electrode.

2. The method according to claim 1, wherein the voltage of the third electrode is higher than the voltage of the first electrode by 1.2V when the left and right viewing angle characteristics are deteriorated.

3. The method according to claim 1, wherein the upper substrate further includes a dielectric film on the third electrode.

* * * * *